Figure 2:
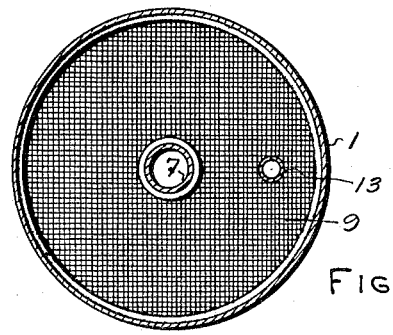

Oct. 13, 1925.

W. B. SMITH

OIL SEPARATOR

Filed June 6, 1923

1,557,103

WITNESS

INVENTOR

Willis B. Smith

Patented Oct. 13, 1925.

1,557,103

UNITED STATES PATENT OFFICE.

WILLIS B. SMITH, OF BURKBURNETT, TEXAS.

OIL SEPARATOR.

Application filed June 6, 1923. Serial No. 643,680.

*To all whom it may concern:*

Be it known that I, WILLIS B. SMITH, a citizen of the United States, residing at Burkburnett, in the county of Wichita and the State of Texas, have invented a new and useful Oil Separator, of which the following is a specification.

This invention relates to an oil separator to be used at producing wells. The invention comprises a tank, a settling chamber in said tank, means for skimming the oil, and means for draining off the water.

The further object of my invention is to provide a device that will separate the oil from the water and allow the sediment such as dirt, sand and other foreign solid matter to settle therefrom.

A further object of my invention is to provide a device of this nature that is very simple and practical and can be manufactured and sold at a very nominal cost.

The nature and advantages of this invention will be better understood when the following detailed description is read in connection with the accompanying drawing, forming a part of this application.

Figure 1:
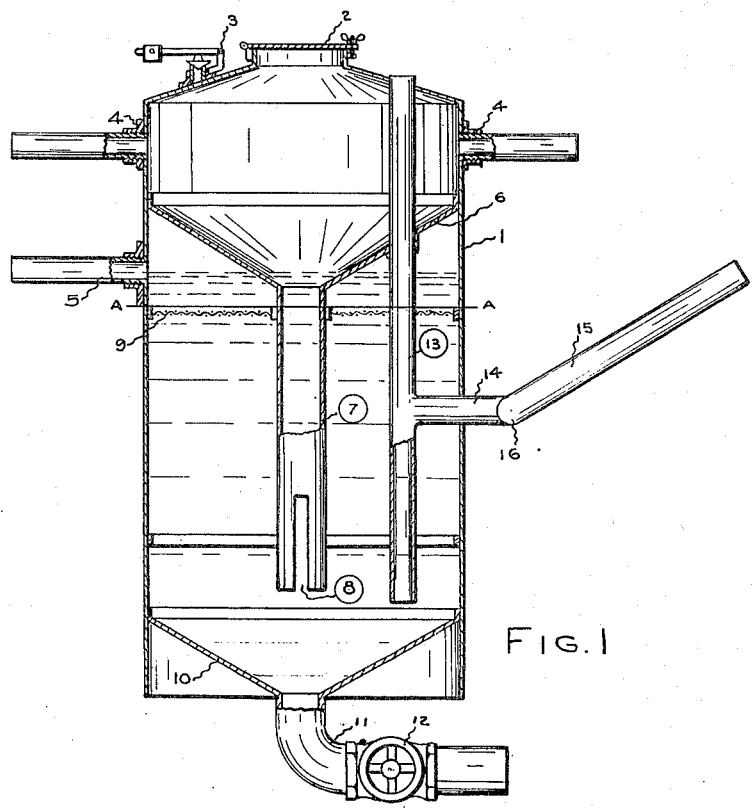

In the drawing:

Figure 1 is a vertical section through the separator embodying the invention; and, Figure 2 is a horizontal section taken on the line A—A of Figure 1.

The subject matter of this invention comprises a tank 1, 2 is a man-hole and cover of the well known design, 3 is a release valve of well known design, 4 are inlets, 5 is an outlet, 6 is a funnel arranged in the tank 1 as shown, 7 is a pipe extending from the center of the funnel 6, downward, 8 is a certain number of longitudinal apertures in the pipe 7 to provide outlets therein in event the congealing substance of the oil should accumulate in a sufficient quantity in the bottom of the tank 1 to plug the bottom of the pipe 7, 9 is a sieve arranged in the tank 1 as shown, the bottom of the tank 1 is formed into a funnel shape as illustrated at 10, 11 is an outlet at the bottom of the tank 1, 12 is a gate valve for the purpose hereinafter described, 13 is a pipe extending from the top of the tank 1 downward terminating near the bottom of the tank 1, 14 is a pipe attached to pipe 13 and extending to the exterior of the tank 1, 15 is a pipe of desired length extending from the hinged joint 16.

The invention operates in the following manner: The crude oil and water from the well enters the tank 1 through the inlets 4, and flows from the funnel 6 through the pipe 7 to the bottom of the tank 1. The oil rises to the top and the water remains in the bottom of the tank. As the oil level raises in the tank 1, it is strained through the sieve 9, preventing the solid matter or substance of the oil from passing through the outlet 5. The solid matter or substance of the oil will settle to the bottom of the tank after it accumulates below the sieve 9. The solid matter or substance may be drained off by opening the valve 12 in the outlet 11. The water may be drained off by lowering the pipe 15 which will allow the water and other fluid contained in the bottom of the tank to drain off. When the water has been drained the pipe 15 may be raised and stop the flow. The man-hole is for the purpose of entering the tank 1 for repair work, and release valve 3 is for the purpose of preventing gas from attaining high pressure in the tank 1.

While it is believed from the foregoing description, the nature and advantages of the invention will be readily apparent, I desire to have it understood that I do not limit myself to what is herein shown and described, and that such changes may be resorted to, when desired, as fall within the scope of what is herein claimed.

What I claim is:

A separator of the character described comprising a cylindrical tank having an opening arranged in the top thereof, a closure therefor, a funnel positioned within the upper end of said tank for dividing the latter into an upper oil receiving chamber and a lower storage chamber, a plurality of inlets leading to said oil receiving chamber, a pipe extension formed with said funnel and projecting downwardly within the oil storage chamber, a funnel arranged within the lower portion of said tank and forming a bottom for said oil storage chamber, a valve controlled outlet leading from said last mentioned funnel, an oil outlet leading from the upper end of said storage chamber, and a water outlet leading from the lower portion thereof, and a screen extending horizontally across said storage chamber immediately below said oil outlet.

WILLIS B. SMITH.